United States Patent [19]

O'Connor

[11] 4,298,151
[45] Nov. 3, 1981

[54] CARRIER RACK

[76] Inventor: Brian J. O'Connor, 1123 Marine Ave., Santa Monica, Calif. 90405

[21] Appl. No.: 136,417

[22] Filed: Apr. 2, 1980

Related U.S. Application Data

[63] Continuation-in-part of Ser. No. 894,124, Apr. 6, 1978, which is a continuation-in-part of Ser. No. 774,522, Mar. 4, 1977.

[51] Int. Cl.³ .............................................. B60R 9/10
[52] U.S. Cl. .............................. 224/329; 224/42.03 B; 211/22
[58] Field of Search ......... 224/329, 42.03 R, 42.03 B, 224/42.05, 42.07, 42.08; 280/769; 211/17, 18, 19, 20, 21, 22

[56] References Cited

U.S. PATENT DOCUMENTS

| 3,877,622 | 4/1975 | McLain | 211/22 X |
| 3,927,810 | 12/1975 | Danon | 224/42.03 B X |
| 4,009,744 | 3/1977 | Joslyn | 224/42.03 B X |
| 4,046,273 | 9/1977 | Hughs | 224/42.03 B X |
| 4,085,874 | 4/1978 | Graber | 224/329 X |

Primary Examiner—Steven M. Pollard
Attorney, Agent, or Firm—Kendrick, Netter & Bennett

[57] ABSTRACT

Rack means for mounting and carring devices such as two-wheeled vehicles (e.g., bicycles) on engine-powered vehicles such as automobiles includes structures for clamping the rack between the trunk and trunk lid, the engine well and engine hood, or between some other opening on the automobile and a closure appended to that opening. Racks of this kind permit carrying two or more bicycles in side-by-side relationship with minimum abrasion of one against another.

20 Claims, 10 Drawing Figures

CARRIER RACK

This application is a continuation-in-part of U.S. patent application Ser. No. 894,124, filed Apr. 6, 1978, entitled CARRIER RACK; and that application is a continuation-in-part of U.S. patent application Ser. No. 774,522, filed Mar. 4, 1977, entitled CARRIER RACK.

This invention relates to rack means for mounting at least one two-wheeled vehicle such as a bicycle on an engine-powered vehicle such as an automobile, truck or van. More particularly, the invention relates to a rack for mounting and carrying two or more two-wheeled vehicles such as bicycles on the front or rear bumper of such engine-powered vehicles or bumper-like member appended to an automobile. The new rack may readily be attached to and detached from such vehicles, yet when attached, presents real difficulty to would-be rack thieves, and bicycle thieves.

The invention also relates to means for lockably securing carrier racks such as bicycle racks and ski racks to the outside of engine-powered vehicles such as cars and vans. Such means are movably attached to the carrier rack, and are adapted to be secured between an opening on the engine-powered vehicle and lockable closure means joined to or appended to that opening.

The invention provides rack means for mounting at least one two-wheeled vehicle on an engine-powered vehicle such as an automobile, truck, van or mobile home. The rack means includes frame means, first support means slidably, rotatably or fixedly joined to and projecting from one side of the frame means, and second support means slidably, fixedly or rotatably joined to, and projecting farther than the first support means from, the same side of the frame means as the first support means. Additional support means similar to the first and second may be added, each new one projecting farther from the frame than the others.

The rack means further comprises third support means joined to and projecting from the same side of the frame as the first and second support means. This third support means includes vehicle-supporting means that lies in substantially the same plane as vehicle supporting means on the first support means. Fourth support means is joined to and projects from the same side of the frame as the first, second and third support means, and includes vehicle-supporting means that lies in substantially the same plane as vehicle-supporting means of the second support means. Both the third and fourth support means preferably include depressions for receiving and supporting two-wheeled vehicles. Each of the third and fourth support means forms an angle with respect to the frame in the range of about 35° to about 85°, more preferably in the range of about 45° to about 65°.

Joined to and projecting from the side of the frame opposite the first, second, third and fourth support means is means for releasably securing the frame between an opening in the engine-powered vehicle and closure means appended to that opening. Such an opening may be the trunk cavity of automobiles; in this case, the appended closure means is the trunk lid. Locking of the trunk lid secures the rack means to the automobile and deters unauthorized removal of the rack from the automobile. For automobiles with a rear-mounted engine or a hatchback, the means for releasably securing the frame to the automobile may be clamped between the engine cover or hatchback and the engine well or opening the hatch covers.

The means for releasably securing the frame to the engine-powered vehicle can be used to secure other carriers and carrier racks, besides bicycle racks, to engine-powered vehicles. For example, such means can be used to secure ski racks and luggage carriers or racks to engine-powered vehicles such as cars and vans. In one embodiment, the securing means are joined to movable means on the rack means or carrier means to permit moving the securing means in several different directions with respect to the rack itself. These movable means permit positioning the securing means nearer to or farther from the opening, and also permit moving the securing means upwardly, downwardly, and from side-to-side on the rack or carrier.

The rack means also includes seating means joined to the frame and shaped so as to seat securely in or on the bumper, body or frame of the engine-powered vehicle, or in or on bracket means joined to the bumper, body or frame of the engine-powered vehicle.

In preferred embodiments, the frame includes at least two relatively vertical means or members joined together by one, two, or more relatively horizontal means or members. In such embodiments, the seating means may be male members formed at or near, or joined to or near the base of the relatively vertical means, and shaped to seat within female means in the bumper, body or frame of the engine-powdered vehicle, or in apertures in means joined to the bumper, body or frame of such vehicles. Alternatively, the male members may be joined to the bumper, body, or frame, and the female members, to the frame. The distance between and relative orientation of the seating means and of the means for releasably securing the rack to the engine-powered vehicle may be, and preferably is, appropriate to deter or preclude disengagement of the male means from the female means where the rack is secured to the engine-powered vehicle. disengagement of the male means from the female means where the rack is secured to the engine-powered vehicle.

As noted, the seating means may simply fit within apertures formed in a bumper surface or body panel surface lying in a plane roughly paralleling the vehicle's roof. Where no such surface exists, a suitable bracket may be joined to the vehicle to provide means for receiving the seating means. An example of such a bracket is shown in FIGS. 4 and 5.

The seating means may also take the form of a bracket or other means joined to the relatively vertical means and cooperating therewith to form means for releasably engaging the bumper, body or frame of the engine-powered vehicle, or for releasably engaging bracket means joined to the bumper, body or frame of the engine-powered vehicle. An example of this embodiment is shown in FIGS. 6 and 7.

Another form the seating means can take is shown in FIGS. 9 and 10. This seating means includes a flange projecting from the frame of the carrier or rack, and a hook of adjustable length.

In one embodiment, both the first and the second support means are joined to one of the relatively horizontal means in the frame, nearer the bottom of the frame than the top. Each support means is movable or translatable along the horizontal support means to facilitate placing the vehicle-supporting portion thereof against a portion of one of the two-wheeled vehicles mounted on the rack means. Further support means may be added, each projecting further from the frame than the others, to provide support for three or more two-wheeled vehicles on the rack. Alternatively, the first and second support means may be rotatably or fixedly attached to a relatively horizontal support means of the frame. One example of this embodiment is shown in FIGS. 6 and 7.

The third and fourth support means are joined to the frame at or near the upper end of the frame, and are spaced sufficiently far apart to provide adequate support for two-wheeled vehicles to be mounted thereon. Each of the third and fourth support means includes a first member having receiving means, preferably at least two depressions therein for receiving and supporting a two-wheeled vehicle. Preferably, the first members on the third and fourth support means lie in planes relatively parallel to each other. The first receiving means in the first member of the third support means lies at least partially along the same line as the first receiving means in the first member of the fourth support means. Thus, these two first receiving means may receive a relatively straight portion of a two-wheeled vehicle such as a bar in the frame of such a vehicle. These first receiving means also lie at least partly in a common plane with the vehicle-supporting means of the first support means. Where one portion of a two-wheeled vehicle is received within the first receiving means on the third and fourth support means, another portion of that same vehicle may be supported by such vehicle-supporting means.

Similarly, second and further receiving means in the first members of the third and fourth support means lie at least partly along another common line so as to receive one portion of a second two-wheeled vehicle. Such receiving means lie at least partly in a common plane with the vehicle-supporting means of the second support means which supports another portion of this second vehicle.

In preferred embodiments, the third and fourth support means include second members that function as supports for the first members, which bear most of the weight of the two-wheeled vehicles carried on the rack.

The rack means is secured to an engine-powered vehicle by means joined to and projecting from the frame opposite the side from which the first, second, third and fourth support means project. These means are adapted for clamping between an opening in the engine-powered vehicle and a closure means appended to that opening. In a preferred embodiment, such means includes a member attached to the frame having a channel portion that is appropriately shaped for clamping between the opening and the closure appended thereto. In another embodiment, the securing means may comprise one, two or more brackets with channel members joined thereto, with the bracket members attached to the relatively horizontal members in the frame, the relatively vertical members in the frame, or both. FIGS. 6 and 7 illustrate one such example. The securing means may be fixedly or movably attached to the frame, and may be attached to horizontal frame members, vertical frame members, or both.

The rack means also includes at least one releasable locking means for locking two-wheeled vehicles to the rack means. Preferably, this locking means locks all such two-wheeled vehicles simultaneously. In one embodiment, this locking means is a pivotable member joined to the third or fourth support means, which can be moved to cover and locked over the receiving means therein.

In a preferred embodiment of the new rack means, the frame includes at least two relatively vertical means or members having rotatable portions that carry the third and fourth support means and the seating means. These rotatable portions permit rotating the third and fourth support means, and, preferably, also permit rotating the seating means into the plane of the frame to facilitate storage, packaging and handling of the frame. Similarly, the preferred embodiment includes rotatable first and second support means to facilitate rotating these supports into the plane of the frame. In addition, the preferred embodiment includes rotatable securing means for rotating these means into the plane of the frame to facilitate the same goals. In one such embodiment, each of the relatively vertical means includes a non-rotatable portion fixedly joined to the frame. Each of the relatively vertical members includes at least two rotatable portions linked thereto, and disposed on opposite sides of the non-rotatable portion. Preferably, the rotatable portions of each relatively vertical means are linked to one another through a rotatable member that passes through the non-rotatable portion of the vertical means and that is fixedly attached to each of the rotatable portions. This configuration deters disassembly of the rack and effectively deters the removal of the rack from an engine-powered vehicle. However, upon disengagement of the rack means from an engine-powered vehicle, the rotatable portions permit rotating the projections on the frame into the plane of the frame for easy storage, packaging, and handling of the rack.

The drawings which accompany this application illustrate preferred embodiments of the new rack means. In the drawings.

Figure 1:
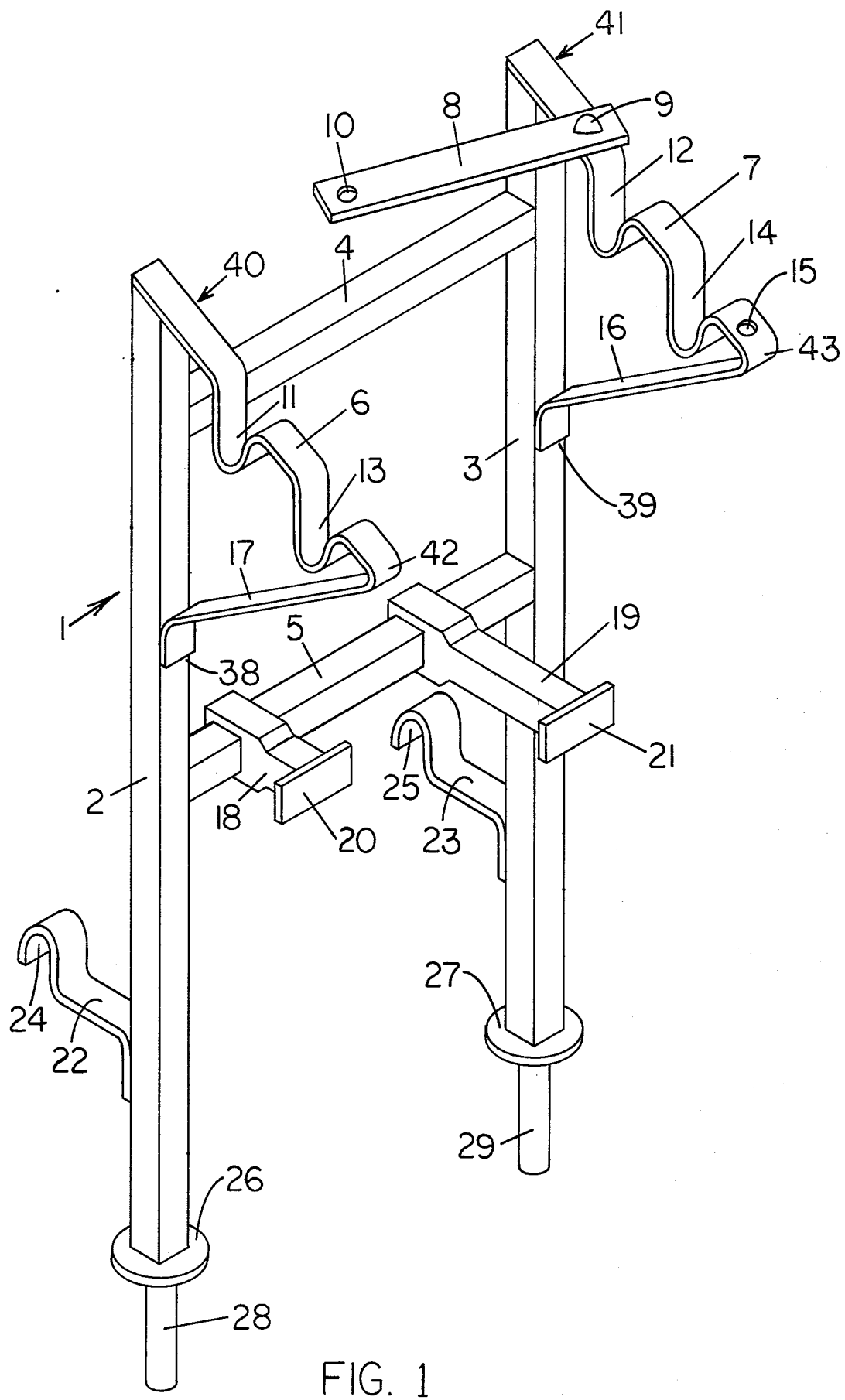
FIG. 1 shows, in perspective, a first embodiment of the new rack means.
Figure 2:
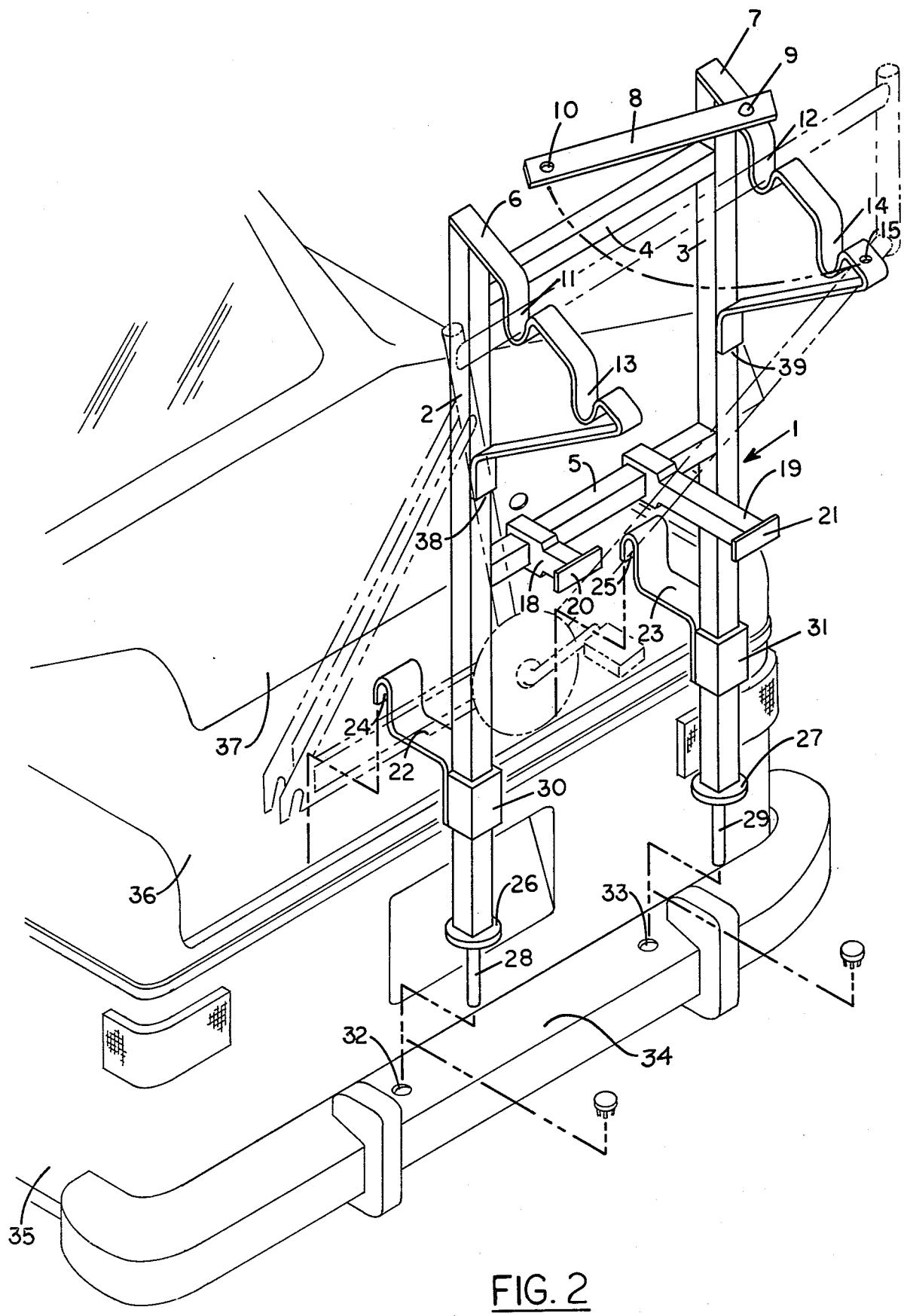
FIG. 2 shows, in perspective, a modified form of the rack means of FIG. 1 in association with an engine-powered vehicle on which the rack may be mounted.

FIGS. 1 and 2 show first embodiments of the new rack means 1, each including a pair of relatively vertical means or members 2 and 3, joined together by horizontal means or members 4 and 5. In the drawings, these relatively horizontal and vertical means are made from square, hollow metal tubing, but they may be made from solid tubing of any shape, from metal or non-metal, or from some combination of the foregoing shapes and materials.

Slidably attached to horizontal support means 5 are first and second support means 18 and 19, respectively.

First support means 18 includes vehicle-supporting surface 20; second support means includes vehicle-supporting surface 21.

Joined at the upper end of relatively vertical means 2 and 3, respectively, are third and fourth support means 40 and 41, respectively. Third support means 40 includes first member 6 having therein vehicle-receiving depressions 11 and 13. Each is relatively U-shaped, and each receives a portion of a two-wheeled vehicle to be mounted and carried on the rack means. Second member 17, attached at one end 42 to first member 6 and at the other end 38 to relatively vertical means 2, supports and braces the first member and vehicles mounted thereon. The included angle between first member 6 and relatively vertical means 2 is in the range of about 35° to about 85°, more preferably in the range of about 45° to about 65°. This canting of first member 6 permits two or more two-wheeled vehicles to be carried on the rack means in side-by-side relationship with minimal abrasion of one such two-wheeled vehicle against another. Moreover, side-by-side mounting of such vehicles, e.g., bicycles, minimizes the distance the vehicles project beyond the rack and beyond the engine-powered vehicle on which the rack is mounted.

Fourth support means 41 similarly includes a first member 7 having two similar vehicle-receiving depressions 12 and 14 therein, and a second member 16 attached at one end 43 to first member 7 and at the other end 39 to relatively vertical means 3. The included angle between first member 7 and relatively vertical means 3 is the same as the included angle between first member 6 and relatively vertical member 2.

Depressions 11 and 12 lie at least partly along the same line to facilitate receiving a part of a two-wheeled vehicle such as the support bar between the fork and center support of a bicycle. Moreover, depressions 11 and 12 lie at least partly in the same vertical plane as vehicle-supporting surface 20 on first support means 18, which may be moved laterally along relatively horizontal support means 5 to abut and support a second portion of the same two-wheeled vehicle mounted in depressions 11 and 12. Similarly, depressions 13 and 14 in first members 6 and 7, respectively, lie at least partly along a common line to facilitate receiving a first portion of a second two-wheeled vehicle. Depressions 13 and 14 lie at least partly in the same vertical plane as supporting surface 21 of second support means 19 to facilitate supporting another portion of this same second two-wheeled vehicle.

With one or more bicycles mounted on the rack means, locking means 8, which is pivotable at rivet 9, is moved to cover depressions 12 and 14, simultaneously indexing hole 10 over hole 15. The hasp of a padlock or other locking device may then be passed through holes 10 and 15 simultaneously, and the lock secured to prevent removal of the two-wheeled vehicles from the rack.

Joined to the bottom of relatively vertical members 2 and 3 are seating means 28 and 29, which here take the form of male members. Where these seating means join the relatively vertical means, washer means 26 and 27 joined between the seating means and the relatively vertical means act to minimize dislocation of the vertical means from the apertures in which the seating means are inserted.

Joined to relatively vertical members 2 and 3, and projecting from the side of the frame opposite the first, second, third and fourth support means are securing means 22 and 23, which include channel portions 24 and 25, respectively.

As better seen in FIG. 2, channel portions 24 and 25 are adapted to fasten to the edge of an opening in a vehicle such as trunk space 36, and are clamped thereto when the appended closure, such as trunk lid 37, is closed thereon. As FIG. 2 illustrates, securing means 22 and 23 need not be fixedly attached to relatively vertical means 2 and 3, but may be attached to slidable sleeves 30 and 31 to accommodate differences in the closures to which the rack means is secured. FIG. 2 also shows that seating means 28 and 29 fit within apertures 32 and 33 of bumper surface 34, and are prevented from penetrating further by spacer means 26 and 27 mounted above seating means 28 and 29, respectively.

Figure 3:
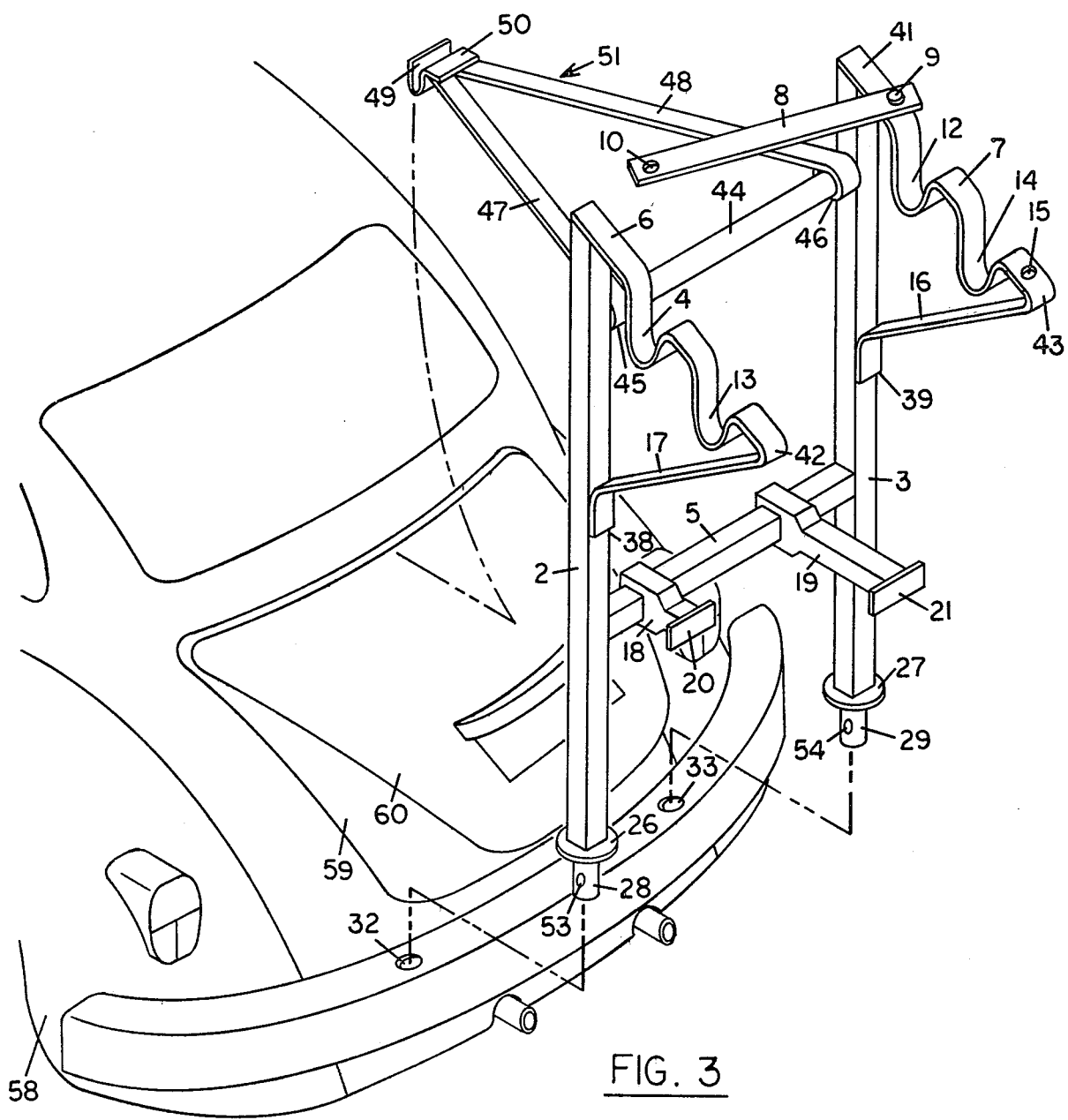
FIG. 3 shows, in perspective, another embodiment of the new rack means in association with a vehicle on which the rack means may be mounted.

FIG. 3 shows an alternative embodiment of the rack means in FIGS. 1 and 2. Here, the upper relatively horizontal support means 44 has a round cross-section to permit rotation of securing means 51 at sleeves 45 and 46. Securing means 51 includes converging projections 47 and 48 joined to channel means 50 having a channel 49 adapted to be clamped at the edge of engine well 59 by closure (engine cover) 60. Because some vehicles have no lock on the closure, seating means 28 and 29 may be provided with apertures 53 and 54, which permit insertion of the shackle of a padlock therethrough. This locks the rack to bumper 57 of engine-powered vehicle 58. In other respects, the rack means illustrated in FIG. 3 is identical to the rack means illustrated in FIGS. 1 and 2.

Figure 4:
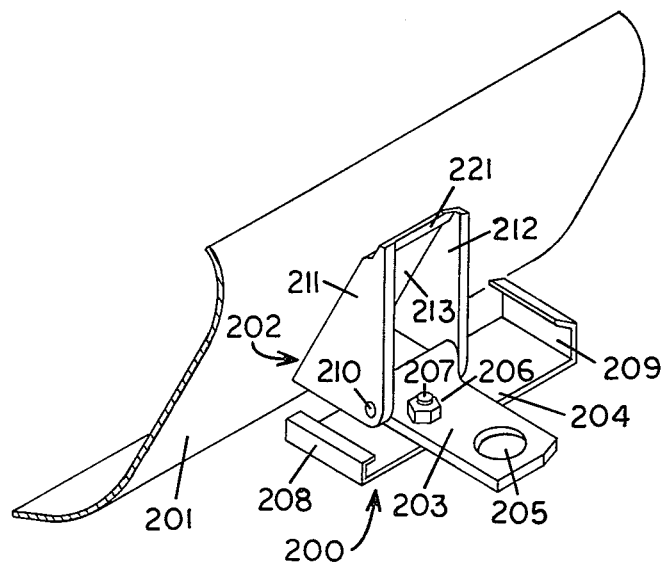
FIG. 4 shows a suitable bracket for receiving the seating means of the new rack means.
Figure 5:
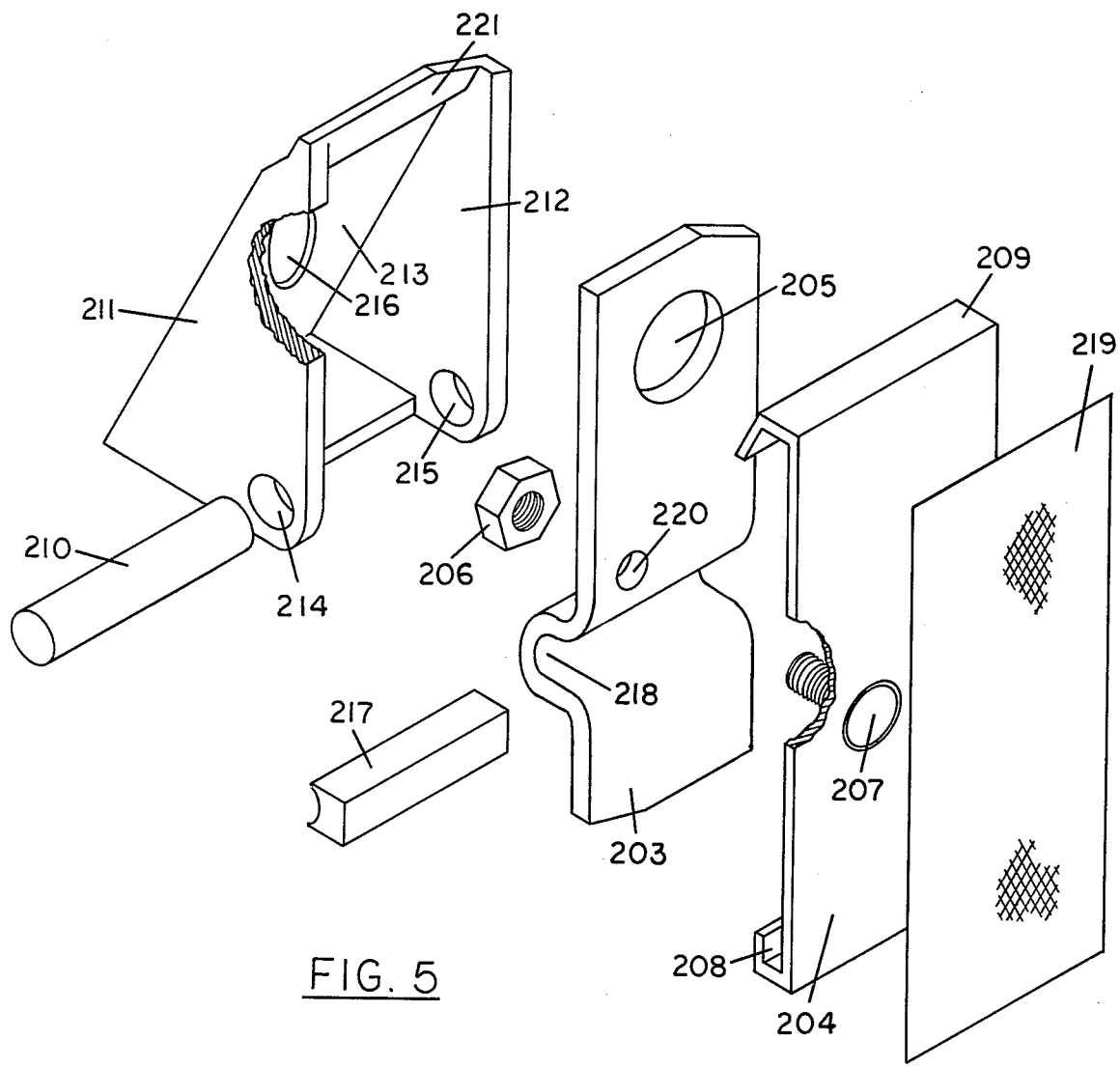
FIG. 5 shows an exploded view of the parts of the bracket illustrated in FIG. 4.

FIGS. 4 and 5 illustrate a bracket 200 attached to bumper 201 that provides an aperture 205 for receiving the seating means on the rack means where the engine-powered vehicle has no surface such as surfaces 57 shown in FIG. 3. Bracket 200 includes three-sided mounting means 202 having integrally formed, substantially parallel hinge receiving plates 211 and 212 joined together by plate means 213. Plate means 213 includes aperture 216 for receiving a fastener to join the bracket to the bumper or body of an engine-powered vehicle. Pin 210, received within apertures 214 and 215 in plate means 211 and 212, respectively, acts as a pivot for plate 203 which includes seating means aperture 205.

As FIG. 5 shows, plate 203 is pivoted to bracket 202 by insertion of pin 210 in channel 218 of plate means 203. Pin 210 is held in channel 218 by spacer/bearing means 217 and by plate 204 that is bolted to plate 203 by bolt 207 passing through aperture 220 and threaded to nut 206. Plate 204 is free to rotate on bolt 207. When plate 204 is rotated from the horizontal position shown in FIG. 4 to the vertical position shown in FIG. 5, plate 204 may be pivoted from the position shown in FIG. 4 to the position shown in FIG. 5, and channel 209 will snap over lip 221 on bracket 202. Reflector 219 may be joined to the outside of plate 204 to provide an aesthetically pleasing appearance to the bracket when not in use.

Figure 6:
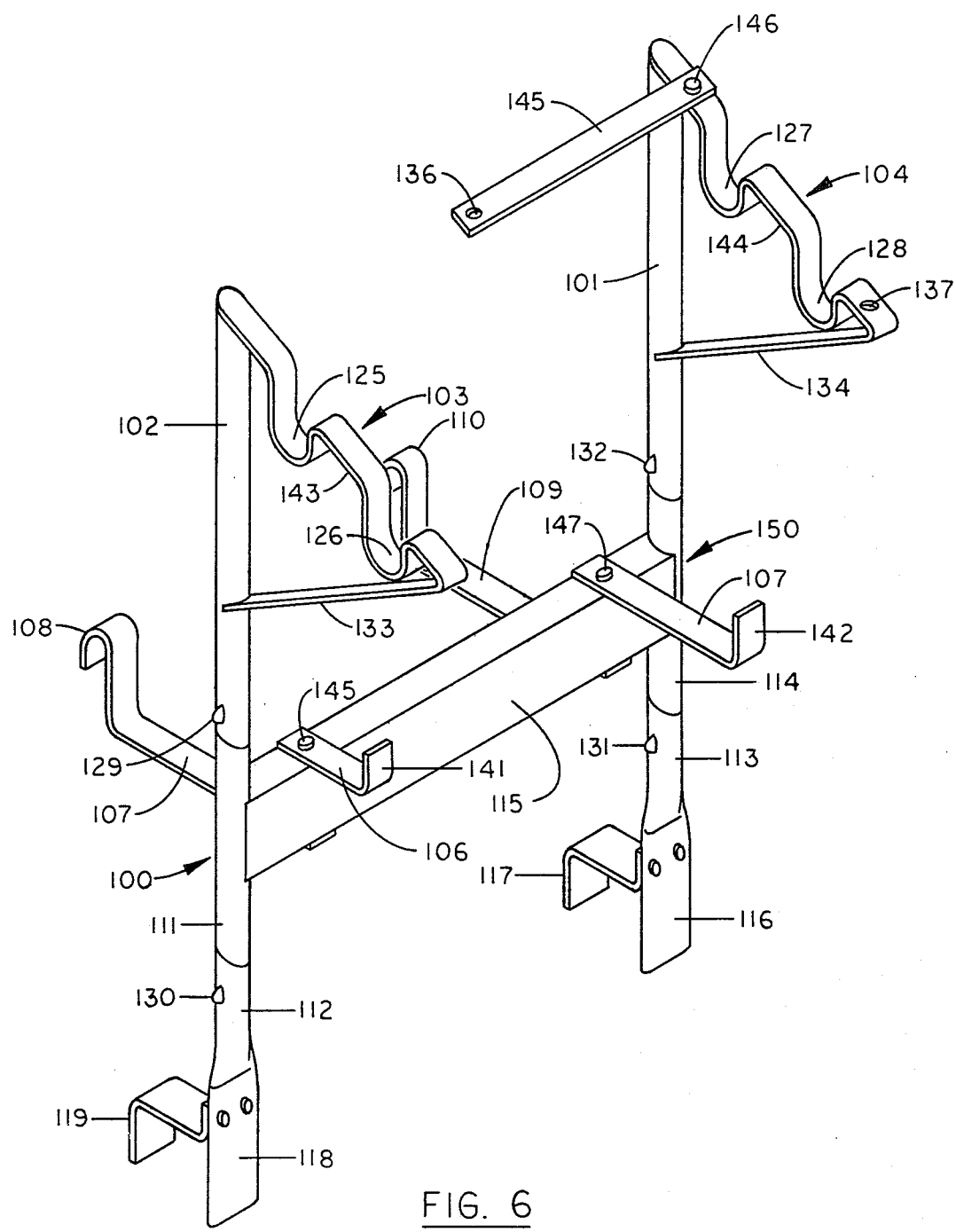
FIGS. 6 and 7 show another embodiment of the rack means of this invention.
Figure 7:
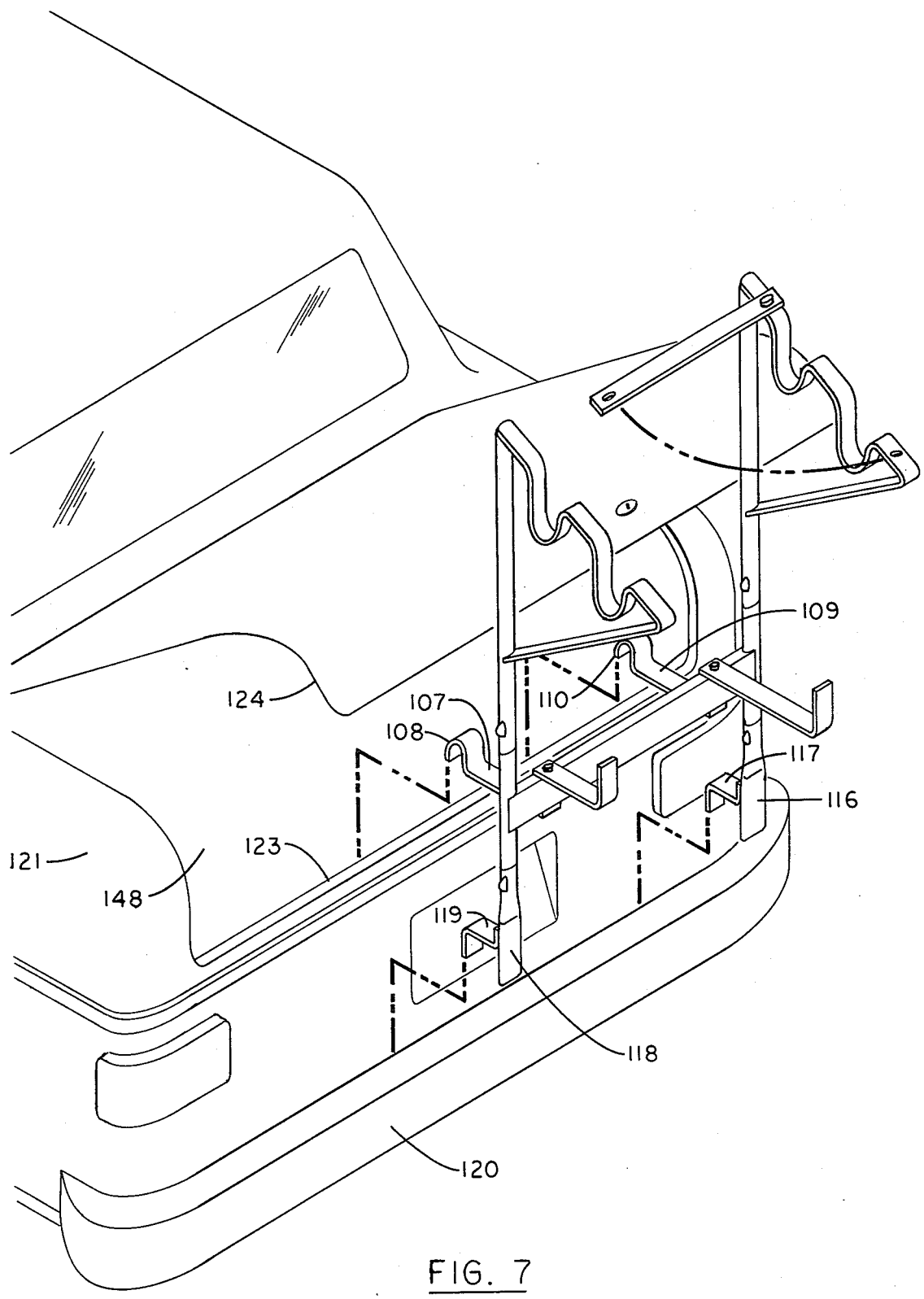
Figure 8:
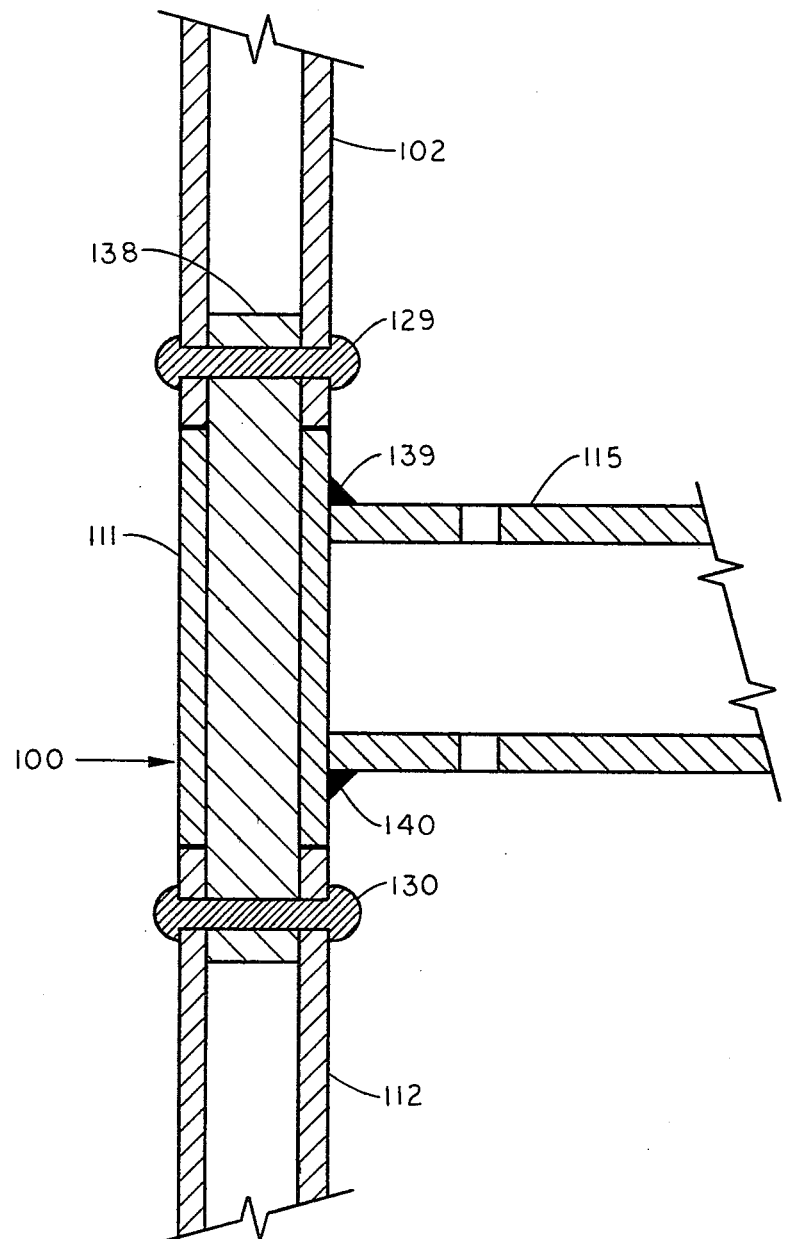
FIG. 8 shows an exploded view of the rotatable and non-rotatable portions of the vertical members in the rack means.

FIGS. 6, 7 and 8 illustrate another embodiment of the rack means in which the frame includes relatively vertical members 100 and 150 fixedly joined to relatively horizontal member means 115. In these drawings, the relatively horizontal and vertical means are made from cylindrical hollow metal tubing, but they may be made from solid tubing of any shape, from metal or nonmetal, or from some combination of the foregoing shapes and materials. Rotatably attached to horizontal support means 115 are first and second support means 106 and 107, respectively. First support means 106 includes vehicle-supporting surface 141; second support means 107 includes vehicle-supporting surface 142.

Joined at the upper end of relatively vertical means 100 and 150, respectively, are third and fourth support means 103 and 104, respectively. Third support means 103 includes first member 143 having therein vehicle-receiving depressions 125 and 126. Each is relatively U-shaped, and each receives a portion of a two-wheeled vehicle to be mounted and carried on the rack means. Second member 133, attached at one end to first member 143 and at the other end to rotatable portion 102 of relatively vertical means 100, supports and braces the first member and vehicles mounted thereon. The included angle between first member 143 and rotatable portion 102 is in the range of about 35° to about 85°, more preferably in the range of about 45° to about 65°. This canting of first member 143 permits two or more two-wheeled vehicles to be carried on the rack means in side-by-side relationship with minimal abrasion of one such two-wheeled vehicle against another. Moreover, side-by-side mounting of such vehicles, e.g., bicycles, minimizes the distance the vehicles project beyond the rack and beyond the engine-powered vehicle on which the rack is mounted.

Fourth support means 104 similarly includes a first member 144 having two similar vehicle-receiving depressions 127 and 128 therein, and a second member 134 attached to one end to first member 144 and at the other end to rotatable portion 101 of relatively vertical means 150. The included angle between first member 144 and rotatable portion 101 is the same as the included angle between the first member 143 and rotatable portion 102.

Depressions 125 and 127 lie at least partly along the same line to facilitate receiving a part of a two-wheeled vehicle such as the support bar between the fork and center support of a bicycle. Further, depressions 125 and 127 lie at least partly in the same vertical plane as vehicle-supporting surface 141 on first support means 106, which may be rotated about pivot 145 into the plane of the frame. Similarly, depressions 126 and 128 in first members 143 and 144, respectively, lie at least partly along the same line to facilitate receiving part of a second two-wheeled vehicle. Depressions 126 and 128 lie at least partly in the same vertical plane and vehicle-supporting surface 142 on second support means 107, which may be rotated about pivot 147 into the plane of the frame.

With one or more bicycles mounted on the rack means, locking means 145, which is pivotable at rivet 146, is moved to cover depressions 127 and 128, simultaneously indexing hole 136 with hole 137 in first member 144. The shackle of a padlock or other locking device may then be passed through the holes 136 and 37 simultaneously, and the lock secured to prevent removal of the two-wheeled vehicles from the rack.

Joined to the bottom of rotatable portions 112 and 113 of relatively vertical means 100 and 150, respectively, are seating means, here formed by flat portions 118 and 116 of relatively vertical members 100 and 150 and brackets 119 and 117, respectively. These clamping members releasably engage bumper 120 (FIG. 7) on engine-powered vehicle 121, thus preventing rotation of rotatable portions 112, 113, 102 and 101. With the seating means engaging bumper 120, the securing means 107 and 109 can engage the edge of opening 148 in engine-powered vehicle 121 through channel members 108 and 110 (FIG. 7).

Joined to relatively horizontal member 115 and projecting from the side of the frame opposite the first, second, third and fourth support means are securing means 107 and 109 which include channel portions 108 and 110, respectively. These channel portions are adapted to fasten to the edge 123 of opening 148 (here the trunk space) and are clamped thereto when the appended closure, here trunk lid 124, is closed thereon (See FIG. 7). The securing means 107 and 109 are preferably rotatable about axes 145 and 147 so that the securing means may be rotated into the plane of the frame for easy storage, packaging and handling of the rack means.

Referring now to FIGS. 6, 7 and 8, relatively vertical means 100 includes non-rotatable portion 111 and rotatable portions 112 and 102 on opposite sides thereof. Rotatable portions 102 and 112 are linked to one another and to relatively non-rotatable portion 111 through rotatable member 138 (FIG. 8), which fits within fixed portion 111 but is sufficiently long to extend beyond both ends of fixed portion 111.

Above relatively horizontal member 115, rotatable member 102 is fixedly attached to rotatable portion 138 by means of rivet pin 129, which passes from the outside of rotatable portion 102 through rotatable member 138 to the other side of rotatable member 102. The enlarged portions at the end of rivet 129 preclude removal of the rivet member from rotatable portion 102. Similarly, rotatable member 112 is linked to rotatable member 138 by means of rivet 130 which passes from the outside of rotatable member 112 through rotatable member 138 and through the opposite side of rotatable member 112. The enlarged ends of rivet pin 130 preclude removal of the rivet pin from the rotatable members. Relatively vertical member 150 is constructed the same as relatively vertical member 100.

When the rack means is disengaged from an engine-powered vehicle, the rotatable portions of the relatively vertical means may be rotated so that the third and fourth support means 103 and 104 rotate into the plane of the frame. Simultaneously, brackets 119 and 117 also rotate into the plane of the frame. In this configuration, the rack means can be readily packaged, stored and shipped. However, the construction also precludes disassembly of the rotatable member from the non-rotatable portion of the relatively vertical means without cutting rivet pins 129, 130, 131 and 132.

Figure 9:
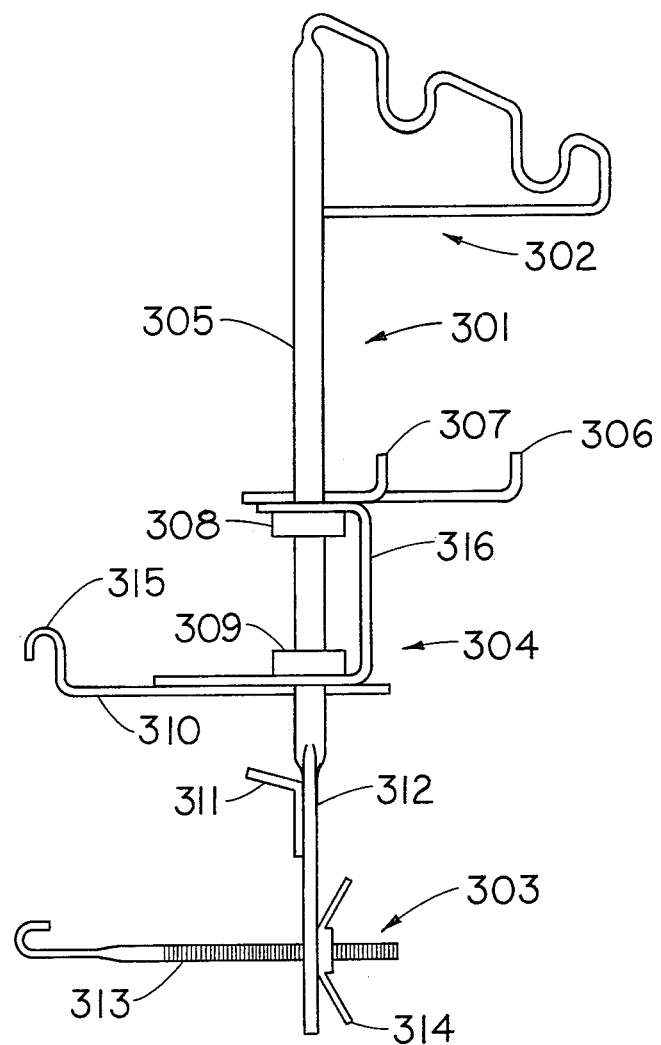
FIG. 9 shows a side elevation view of another embodiment of the new carrier or rack.
Figure 10:
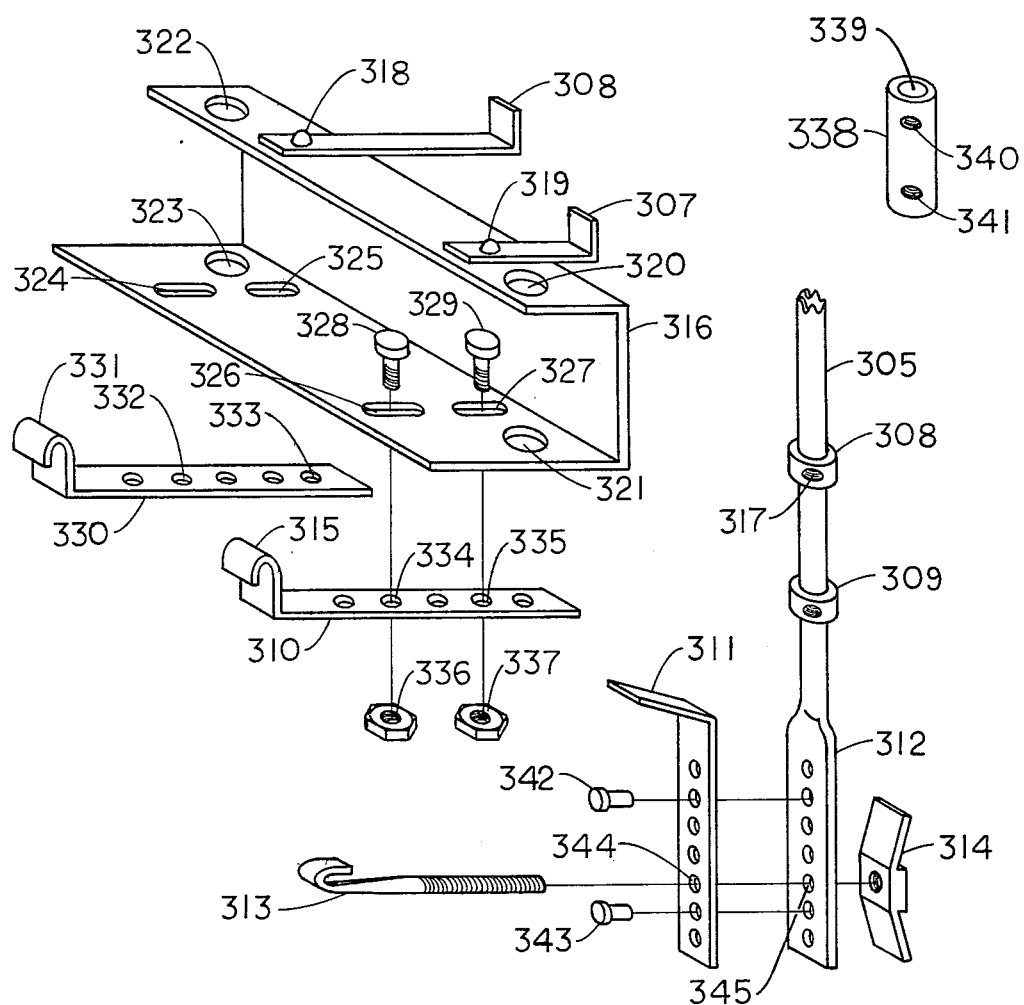
FIG. 10 is an exploded perspective view of the components of the securing means and of the seating means for the embodiment shown in FIG. 9.

Referring now to the embodiments illustrated in FIGS. 9 and 10, bicycle rack or carrier means generally designated 301 include third and fourth support means (generally designated 302) that are substantially similar to third and fourth support means 40 and 41 shown in FIGS. 1 and 2, for example. Carrier means 301 also includes two relatively vertical means or members such as vertical means 305. U-shaped horizontal frame member 316 has two pairs of holes therein, namely holes 320 and 321, and holes 322 and 323, respectively.

To assemble the embodiment shown in FIG. 9, vertical members such as 305, without flattened portion 312 at the bottom thereof, are inserted into hole 320, collar 308, collar 309, and then hole 321, after which flattened portion 312 is formed. In similar fashion, another vertical member is passed through holes 322 and 323 and another pair of collars such as collars 308 and 309. (Alternatively, a cylindrical sleeve 338 with opening 339 therein and set screws 340 and 341 can be used in place of the pair of collars.) Because collars such as 308 and 309 can be secured to vertical member 305 anywhere along its length, U-shaped horizontal member 316, with adjustable securing means 310 and 330 appended thereto, can to that extent be fixed to any desired place along the length of such vertical means as 305.

U-shaped horizontal support member 316 also carries first support means 307 and second support means 308 that are pivotably attached to U-shaped horizontal member 316 at 319 and 318, respectively. The rotatable attachments of these support members permits rotating them into and out of the plane of the carrier rack for convenient storage, packing and shipping. Similarly, because vertical frame means such as vertical member 305 are rotatable in holes 320 and 321, for example, that member can also be rotated into and out of the plane of the carrier for easy storage, packing and shipping as well.

U-shaped horizontal member 316 also carries securing means 310 and 330. These securing means include U-shaped clamps 315 and 331, respectively, which seat on the lip or edge of the opening on the engine-powered vehicle to which the rack is to be secured. Securing means 310 and 330 are joined to U-shaped horizontal member 316 by means of nuts 336 and 337 and bolts 328 and 329, which pass through slots 326 and 327 in U-shaped member 316, and through holes 334 and 335 in securing means 310. Similarly, nuts and bolts are provided to pass through slots 324 and 325 in U-shaped member 16 and through complementary holes 332 and 333 in securing means 330. means 326, 327, 324 and 325 in U-shaped horizontal member 316 permit adjusting the position of securing means 310 and 330 in relation to the opening in the engine-powered vehicle to which the securing means fasten.

The seating means in this embodiment includes flattened end portion 312 of vertical support member 305, flange member 311, and bolts 342 and 343 for joining flange member 311 to flattened end portion 312. Hook-shaped bolt 313 is adapted to fasten to a bumper or body portion of the engine-powered vehicle, and its length can be readily adjusted.

I claim:
1. Rack means for mounting at least one two-wheeled vehicle having a substantially triangular-shaped frame on an engine-powered vehicle comprising a frame, first support means slidably joined to and projecting from one side of said frame, second support means slidably joined to and projecting farther than said first support means from said one side of the frame, third support means joined to and projecting from said one side of the frame, said third support means including means for receiving and supporting the horizontal member of said substantially triangular-shaped frame of at least one two-wheeled vehicle, fourth support means joined to and projecting from said one side of the frame, said fourth support means including means for receiving and supporting the horizontal member of said substantially triangular-shaped frame of at least one two-wheeled vehicle, said receiving and supporting means lying at least partly along a common line, each of said third and fourth support means forming an angle with respect to said frame in the range of about 35° to about 85°, means joined to and projecting from the second side of said frame for being releasably secured between an opening in said engine-powered vehicle and closure means appended to said opening, and seating means joined to said frame and shaped to join said frame to said engine-powered vehicle.

2. The rack means of claim 1 wherein said frame includes at least two relatively vertical means joined together by at least two relatively horizontal means.

3. The rack means of claim 2 wherein each of said third and fourth support means includes first members joined at one end to said relatively vertical means and having at least two vehicle-receiving depressions therein.

4. The rack means of claim 3 wherein each of said third and fourth support means includes a second member joined at one end to said first member and to said relatively vertical means at its other end.

5. The rack means of claim 1 wherein said projecting means comprises at least one bracket having means adapted to be clamped between said opening and said closure.

6. The rack means of claim 5 wherein said frame includes two relatively vertical means including two brackets, one joined to each of said two relatively vertical means in said frame.

7. The rack means of claim 5 wherein said means adapted to be clamped between said openings and said closure is rotatably appended to a horizontal member in said frame.

8. The rack means of claim 2 wherein each of said seating means comprises male members joined near the base of each relatively vertical means, and said projecting means deters disengagement of said male members from said engine-powered vehicle when said closure is closed upon said opening.

9. The rack means of claim 1 wherein said seating means seats in bracket means that includes means for securing said bracket to said engine-powered vehicle, means rotatably hinged to said bracket securing means including means for receiving said seating means, and means rotatably joined to the seat receiving means for releasably clamping said receiving means to said bracket securing means.

10. The rack means of claim 1 including means for locking said at least one two-wheeled vehicle to at least one of said support means.

11. Rack means for mounting at least one two-wheeled vehicle having a substantially triangular-shaped frame on an engine-powered vehicle comprising a frame, first support means including a surface for supporting said two-wheeled vehicle joined to and projecting from one side of said frame, second support means including a second surface for supporting a two-wheeled vehicle joined to and projecting farther than said first support means from said one side of the frame, third support means joined to and projecting from said one side of the frame, said third support means for receiving and supporting the horizontal member of said substantially triangular-shaped frame of at least one two-wheeled vehicle, fourth support means joined to and projecting from said one side of the frame, said fourth support means including means for receiving and supporting the horizontal member of said substantially triangular-shaped frame of at least one two-wheeled vehicle, said receiving and supporting means on said third and fourth support means lying at least partly along a common line, each of said third and fourth support means forming an angle with respect to said frame in the range of about 35° to about 85°.

12. The rack means of claim 18 wherein the rotatable portions of each vertical support are linked to one another through a rotatable member that passes through said non-rotatable portion and that is fixedly attached to each of said rotatable means.

13. The rack means of claim 12 wherein each of said vertical supports is fixedly joined to at least one horizontal support in said frame.

14. The rack means of claim 11 further comprising means joined to and projecting from the second side of said frame for being releasably clamped in a lockable closure on said engine-powered vehicle, and seating means on said frame that releasably engage said engine-powered vehicle, and that lock said frame thereto when said clamping means is clamped in said lockable closure.

15. The rack means of claim 14 wherein said clamping means comprises means joined to and projecting from the second side of said frame for releasably engaging an opening in said engine-powered vehicle and closure means appended to said opening.

16. The rack means of claim 14 wherein said seating means comprises bracket means on at least one vertical support that cooperates with said vertical support to releasably engage said engine-powered vehicle.

17. Rack means for mounting at least one two-wheeled vehicle having a substantially triangular-shaped frame on an engine-powered vehicle comprising a frame, first support means including a surface for supporting said two-wheeled vehicle joined to and projecting from one side of said frame, second support means including a second surface for supporting a two-wheeled vehicle joined to and projecting farther than said first support means from said one side of the frame, third support means joined to and projecting from said one side of the frame, said third support means including means for receiving and supporting the horizontal member of said substantially triangular-shaped frame, fourth support means joined to and projecting from said one side of the frame, said fourth support means including means for receiving and supporting the horizontal member of said substantially triangular-shaped frame, said receiving and supporting means on said third and fourth support means lying at least partly along a common line, each of said third and fourth support means forming an angle with respect to said frame in the range of about 35° to about 85°, wherein said first, second, third and fourth support means are movable into and out of the plane of said frame.

18. The rack means of claim 17 wherein said frame includes at least two vertical supports having non-rotatable portion and having rotatable portions carrying the third and fourth support means.

19. The rack means of claim 17 wherein the frame includes a single U-shaped horizontal member with two vertical support members rotatably secured therein, said vertical members having said third and fourth support means, respectively, joined thereto.

20. A rack means for carrying two wheeled vehicles on the outside of an engine-powered vehicle comprising a frame including means for carrying a load on the rack, said frame including means comprising at least two U-shaped support means for each two-wheeled vehicle in a first plane and separate support means for each two-wheeled vehicle in a second plane for mounting two or more two-wheeled vehicles in side-by-side relationship with minimal abrasion of one such two-wheeled vehicle against another, and adjustable means joined to and projecting from the frame for being releasably clamped in a lockable closure on said engine-powered vehicle.

* * * * *